United States Patent [19]

Hashimoto et al.

[11] 4,424,536
[45] Jan. 3, 1984

[54] DATA EXCHANGE CIRCUIT FOR A MAGNETIC MEMORY APPARATUS

[75] Inventors: Yasuich Hashimoto; Yasuyuki Oda, both of Oume, Japan

[73] Assignee: Tokyo Shibaura Denki Kabushiki Kaisha, Kanagawa, Japan

[21] Appl. No.: 334,362

[22] Filed: Dec. 24, 1981

[30] Foreign Application Priority Data

Dec. 26, 1980 [JP] Japan .................................. 55-184014

[51] Int. Cl.$^3$ .............................................. G11B 5/09
[52] U.S. Cl. ......................................... 360/51; 360/40
[58] Field of Search ........................ 360/51, 40, 41, 43

[56] References Cited

U.S. PATENT DOCUMENTS 4,371,975  2/1983  Dugan ................................... 360/51
4,385,396  5/1983  Norron .................................. 360/51

Primary Examiner—Vincent P. Canney

Attorney, Agent, or Firm—Oblon, Fisher, Spivak, McClelland & Maier

[57] ABSTRACT

A data exchange circuit to change modified frequency modulation (MFM) signals read from a magnetic memory media and converted into data pulse signals to non-return-to-zero signals. The circuit comprises an input flip-flop which receives MFM data pulse signals from a pulse forming circuit. Pre outputs of the input flip-flop is received by a phase locked loop and the other output of the input flip-flop is received by a delay circuit to vary the pulse width of the MFM pulse signal. Instruction signals are provided to the delay circuit to define data reading margins, and to accommodate variations in data widths or data shifts when no particular margin is determined. The phase locked loop synchronizes it's output when the output of the MFM data pulse signal in order to provide clock signals for non-return-to-zero data. The outputs of the phase locked loop and the delay circuit are converted to respective flip-flops in order to generate the non-return-to-zero signals.

2 Claims, 5 Drawing Figures

DATA EXCHANGE CIRCUIT FOR A MAGNETIC MEMORY APPARATUS

BACKGROUND OF THE INVENTION

1. Field of the Invention

This invention relates to a magnetic memory apparatus adapting modified frequency modulation (MFM) for a recording system, and more particularly to a data exchange circuit to exchange read MFM data signals to non-return to zero (NRZ) type data signals by discriminating the MFM signals between clock and data.

2. Description of the Prior Art

Referring to FIG. 1 which is a block diagram of the data exchange circuit of the prior art, and FIG. 2 which is a timing chart of signals explaining the operation of FIG. 1, a read out signal 200 from a magnetic recording media through a magnetic head (not shown) has been differentiated and supplied to a level detector 100. The level detector 100 compares the read out signal 200 with an input level of zero volts.

If the read out signal 200 is higher than the zero volt level the level detector 100 applies a high output signal to a pulse forming circuit 101. If the read out signal 200 is lower than the zero volt level then the level detector 100 applies a low output signal to the pulse forming circuit 101. The pulse forming circuit 101 forms a pulse signal 202 of predetermined width when the input signal 201 thereto changes it's state. The pulse signal 202 represents the MFM data pulse.

The pulse forming circuit 101 applies two output signals to the phase detector 102, one signal 203 being "High" at each trailing edge of the MFM data pulse signal 202, and the other being an MFM data pulse signal 204 which is the equivalent of the MFM data pulse signal 202 delayed for a predetermined time.

The prior art data exchange circuit includes a phase locked loop (hereinafter called PLL) consisting of the phase detector 102, a low pas filter 103, a voltage controlled oscillator 104 and a frequency divider 105 as shown in FIG. 1. Also shown in a data forming circuit 106. In the MFM recording system, the data pulse 202 can be characterized by three different periods or duration times. Namely, if the data is "101", for example, the period is the longest and the longest period corresponds to a frequency F. For example, if the data is "100", the frequency is 2F.

The PLL operates in the following manner. The phase detector 102 comprises the leading edge of the pulse signal 205 supplied by the voltage controlled oscillator 104 with the leading edge of the MFM data pulse signal 204 when the signal 203 becomes "High". The phase detector 102 applies an output corresponding to the phase difference between the signals 204 and 205 to the voltage controlled oscillator 104 through the low pass filter 103, such that the signal 205 stays in phase with the MFM data pulse signal 204. Thus in the steady state, the signal 205 is synchronized to the leading edge of the MFM data pulse signal 204 and oscillates at a frequency of 4F. The frequency divider 105 inverts it's output 206 at each trailing edge of the signal 205. Upon initial reading of an MFM data pulse signal 204 having a frequency 2F obtained by a continuous zero data "00", the PLL synchronizes to the signal 205 when the output signal 206 of the frequency divider 105 is at a "LOW" level. As a result of the aforesaid synchronization, the data forming circuit 106 will provide a "1" output signal 208 when the MFM data pulse signal 204 is at a "High" level at the time the output signal 206 changes state from a "High" level to a "Low" level, i.e. the trailing edge of the signal 206. Conversely, in the absence of MFM data, i.e. when the signal 204 is "Low" upon the trailing edge of the signal 206, then the circuit 106 produces a "0" data output. The data formed in the data forming circuit 106 is NRZ data and the signal 206 is the clock signal for reding out the formed data.

The MFM data pulse signal 204 will usually appear shifted about a center of a normal position under influences of so-called peak shifts and noises which are characteristics of the magnetic recording media. Therefore it is necessary to accommodate marginal unexpected position shifts in the MFM data pulse signal and change the data in accordance with the clock signal. With a magnetic memory apparatus, in general, it is necessary to provide a function for changing the absolute position of the clock signal and the MFM data pulse signal to accomodate the marginal shifting and to change the data concurrently with recovering the position shift of the MFM data pulse occured constantly by some cause. Then a following operation takes place.

Referring to FIG. 2, the MFM data pulse 204 is detected at the trailing edge of the clock signal 206 when it is at a "High" level. Thus, the basis of the NRZ 208 data is decided at the trailing edge of the clock signal 206. In a highly simplified operation a signal 207 of a predetermined duration is formed at a "High" level based on the trailing edge of the MFM data pulse 202 input into the data forming circuit time, and attain's "Low" level after the trailing edge of the clock signal 206. If the signal 207 is transfered to a flip-flop at the trailing edge of the clock signal 206, the output of the flip-flop will be the NRZ data 208.

In the MFM recording system, theoretically it is possible to set the average delay time from the MFM data pulse 202 to the "High" level of the signal 207 such that the average value T1 is ¼ the period of the frequency 2F shown in FIG. 2. Therefore, the delay time in the delaying circuit is generally set with delay time T1 which is ¼ the period of the frequency 2F.

Nextly, discussed are considerations concerning margins required for reading data signals containing time shifts. If a time delay shift is set such that the duration T1 is smaller than the aforesaid average value, the amount of time for reading will be reduced when the MFM data pulse 202 is marginally delayed. On the other hand, if the delay time is set such that the duration T1 is larger than the aforesaid average value, the amount of time for reading will be reduced when the MFM data pulse 202 is marginally advanced with respect to the normal position, which results in shortening the duration T2 shown in FIG. 2. As explained above, the prior art data exchange circuit requires two delaying circuits, one for delaying the MFM data pulse 204 from the data pulse 202, and one for delaying the signal 207 from the data pulse 202. The margin for phase detecting of a shift of the MFM data pulse 202 is reduced when the time from the leading edge of the signal 203 to the leading edge of the MFM data pulse 204 is over ½ the period of the MFM data pulse 204. The interval between the leading edge of the signal 203 and the leading edge of the signal 204 should be so slightly adjusted as to get the most margin when the MFM data pulse 202 appears at the normal position. Also, the delaying circuit for forming the signal 207 should be slightly adjusted for the reason explained above. In general, an adjustable delaying circuit is undesirably expensive and requires maintenance to maintain the requisite adjustment.

SUMMARY OF THE INVENTION

Accordingly, one object of the invention is to provide a new and improved data exchange circuit for a magnetic memory apparatus wherein it is possible to make slight time delay adjustments in a minimum of time using a simple adjusting circuit.

It is another object of the invention to provide a data exchange circuit for a magnetic memory apparatus suitable for a magnetic disc drive apparatus.

It is another object of the invention to provide a data exchange circuit for a magnetic memory apparatus to obtain a better data phase margin for accomodating data phase variations during data recording by means of a simple circuit.

These and other objects are achieved by providing a new and improved data exchange circuit for the magnetic memory apparatus including:

means for changing modified frequency modulation signals to non-return to zero data signals synchronized to a clock signal with a phase locked loop synchronized to the modified frequency modulation signals read from a magnetic memory media;

means for phase comparing the falling edge of the modified frequency modulation signals with an output signal being fed back from the phase locked loop;

means for generating the clock signal for non-return to zero data signals with a predetermined frequency relative to the output signal being fed back from the phase locked loop;

means for generating the non-return-to-zero data by the clock signal and a signal to maintain a given state for a time determined from the rising edge of the modified frequency modulation signals to the end of the phase comparison; and means for adjusting relative time relation between the modified frequency modulation signals and the clock signal to vary the pulse width of the modified frequency modulation signals.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
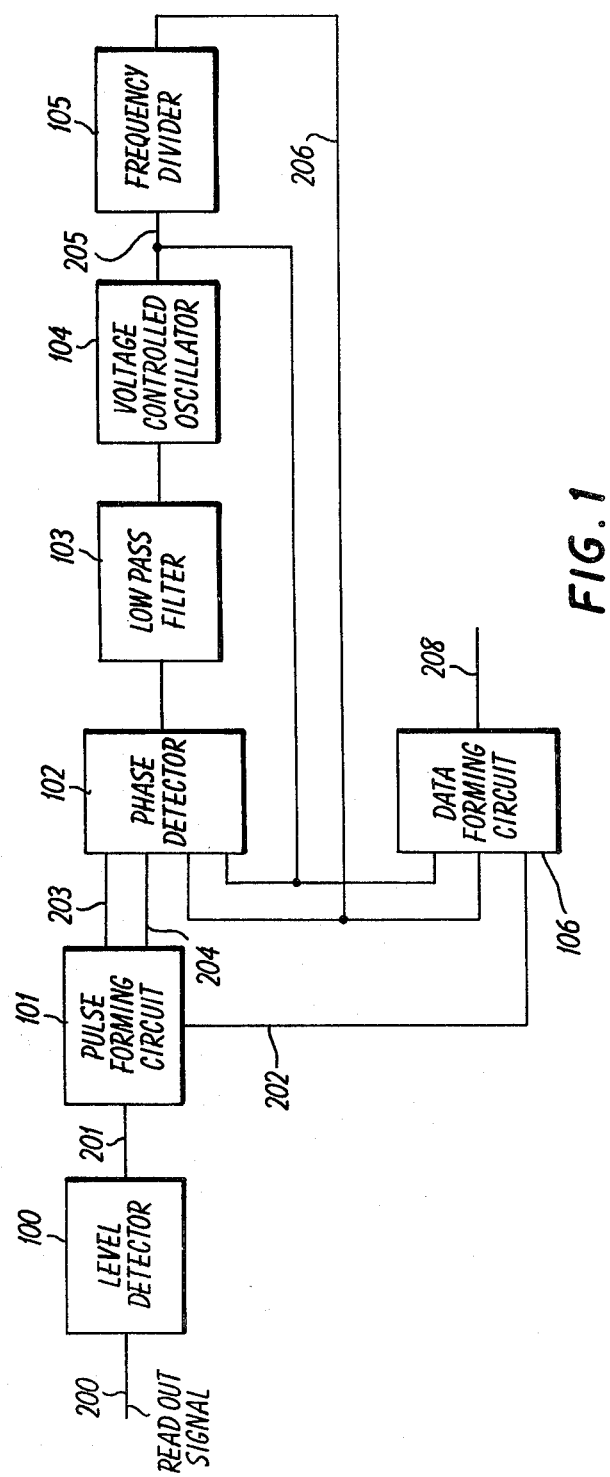
FIG. 1 is a block diagram of a prior art data exchange circuit for a magnetic memory apparatus.
Figure 2:
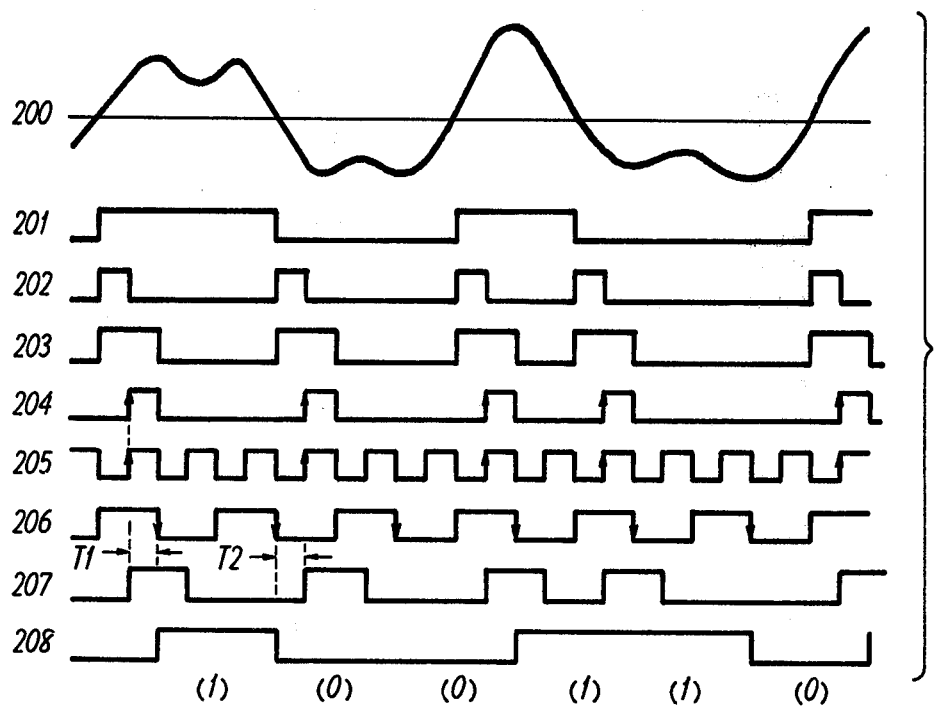
FIG. 2 is a timing chart for the block diagram shown in FIG. 1.
Figure 3:
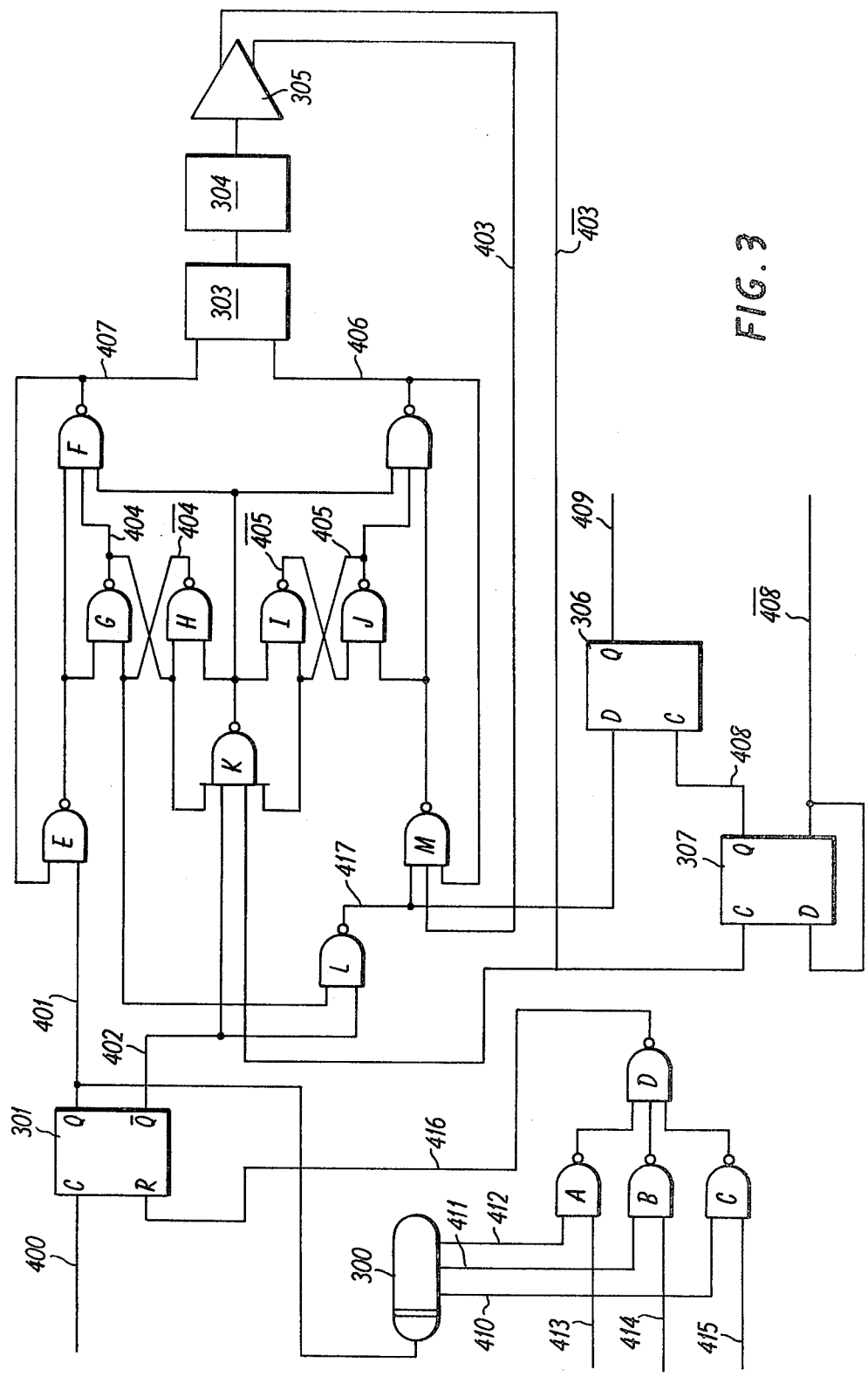
FIG. 3 is a circuit diagram of the data exchange circuit for a magnetic memory apparatus of the present invention.

Referring now to the drawings, wherein like reference numerals designate identical or corresponding parts throughout the several views, and more particularly to FIG. 3 thereof, a delay circuit 300, two input NAND gates A, B, C, E, G, H, I, J and L, and three input NAND gates D, F, K, M and N are shown. The NAND gates G and H are connected to form an "active low" flip-flop wherein the output of the NAND gate G is a set output terminal and the output of the NAND gate H is a reset output terminal. The NAND gates I and J are connected to form an "active low" flip-flop wherein the output of the NAND gate J is a set output terminal and the output of the NAND gate I is a reset output terminal. There are also three D-type flip-flops 301, 306 and 307 having respective data input terminals D, respective clock input terminals C, respective master reset input terminals R, respective set output terminals Q, and respective reset output terminals identified by $\overline{Q}$. A signal 400 corresponds to the MFM data pulse signal 202 from the output of the pulse forming circuit 101 as shown in FIG. 1. The signal 400 is used to derive signals 401 and 402 at the Q and $\overline{Q}$ outputs of the flip-flop 301, which in turn are used to perform a phase comparison with output signals 406 and 407. Thus, a phase comparator is formed from the block of phase comparison circuits and include a phase to voltage convertor 303 for converting the output signals 406 and 407 of the block of the phase comparison circuits to voltage signals. Also provided coupled to the output of converter 303 are a low pass filter 304 and a voltage controlled oscillator 305.

Figure 5:
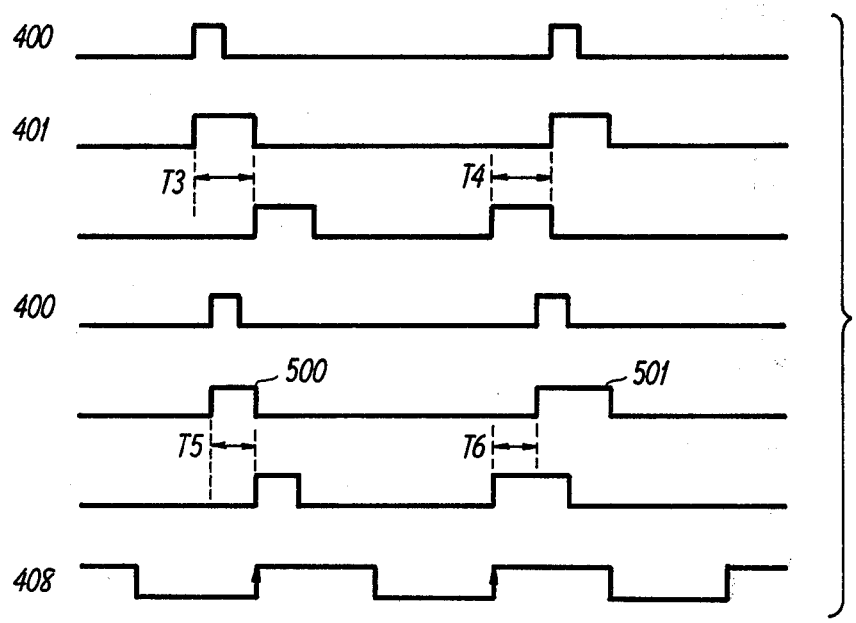
FIG. 5 is another timing chart for the data exchange circuit of FIG. 3.
Figure 4:
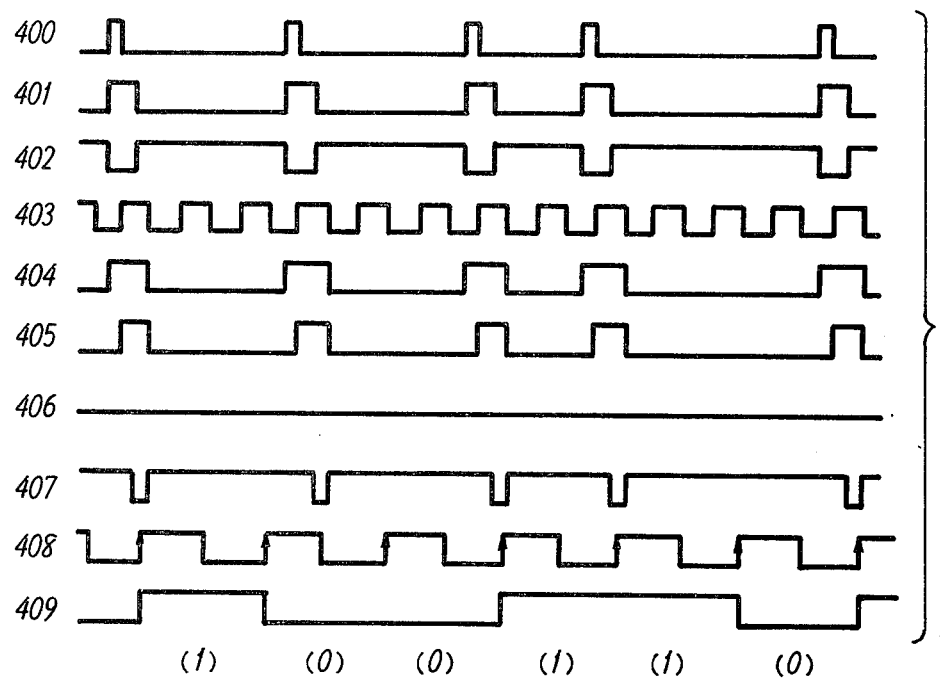
FIG. 4 is a timing chart for the data exchange circuit of FIG. 3.

Nextly described is the operation of this invention. Referring now to FIGS. 4 and 5 the operation of the circuit of FIG. 3 is explained in more detail. Generally, hereinafter a logic "0" refers to a low level signal and a logic "1" refers to a high level signal. The phase locked loop (PLL) is designed such that the trailing edge of the output signal 403 from the voltage controlled oscillator 305 is synchronized with the trailing edge of the output signal 401 of the flip-flop 301 at the trailing edge of the output signal 408 of the flip-flop 307.

The flip-flop 301 has an output signal of "1" at the output terminal Q and an output signal of "0" at the output terminal $\overline{Q}$ whenever it receives a data pulse 400 at its "S" input. The signal 401 is delayed for a predetermined time through the delay circuit 300, and the signals 410, 411 and 412 appear sequentially in the order of their number. The signals 413 and 415 are instruction signals to define a data reading margin to accomodate variations in data widths or data shifts. When no particular margin is determined, the signal 414 is "1" and the signals 413 and 415 are "0". During the time period when the signal 414 is "1", the signal 411 is transfered through the NAND gates B and D, and it becomes "1" as a signal 416. The signal 416 resets the flip-flop 301, and the flip-flop 301 has an output of "0" at the output terminal Q (signal 401) and an output of "1" at the output terminal $\overline{Q}$ (signal 402). In this way, the effective delay time produced by the delay circuit 300 during which time the signal 401 is "1" can be selected, and the MFM data pulse can be designed with a desired pulse width. The output signal 403 and the inverse output signal $\overline{403}$ of the voltage controlled oscillator 305 have a frequency 4F which is twice the frequency 2F. Normally, under operation of the PLL the trailing edge of the signal 401 is coincident with the trailing edge of the signal 403. In FIG. 4 a time difference between the two signals is shown in actual state for convenience of explanation. When the signal 402 makes the signal 417 "1" through the NAND gate L, phase comparison is possible. The NAND gate E outputs the signal "0" in response to the input signal 401 being "1" and its other input signal 407 being "1". Therefore the flip-flop constructed by the NAND gates G and H is set. Then the signal 404 becomes "1" and the inverse signal 404 becomes "0". Phase comparison is continued because the signal 417 is kept "1" due to the signal 40 input to the NAND gate L being "0". The NAND gate M outputs a "0" signal in response to input signal 417 being "1" and the other input signal 406 being "1". Therefore the flip-flop constructed by the NAND gates I and J is set. When the signal 405 becomes "1" and the inverse signal $\overline{405}$ becomes "0", and if at least one of the signals 402 and 403 is "0", the output of the NAND gate K remains at "1". At this time if the signal 404 is "1", the NAND gate F enables a phase difference to be detected. On the otherhand, if the signal 405 is "1", it will also be possible to detect a phase difference by means of the NAND gate N.

As shown in FIG. 4, the signal 401 becomes "0" at first and the output of the NAND gate E becomes "1", and then the signal 407 becomes "0". At the same time, the signal 402 becomes "1". At this point, if the signal 403 becomes "1" and the signal $\overline{403}$ becomes "0", the output of the NAND gate K becomes "0", because the inputs 404, 405 and 402 of the NAND gate K have been "1". Then output 407 of the NAND gate F becomes "1". As a result of above operation, the phase difference between the signal 401 and the signal 403 is detected for the duration of time that the signal 407 is "0". The phase to voltage convertor 303 supplies the voltage controlled oscillator 305 with a voltage corresponding to the duration of time that the signal 407 was "0", through the low pass filter 304. The voltage controlled oscillator 305 oscillates in response to the input voltage and operates to synchronize the trailing edge of it's output signal 403 with the trailing edge of the signal 401.

However, if the trailing edge of the signal 403 occurs before the trailing edge of the signal 401 the circuit would operate as described hereafter. The signal 406 will be "0" whenever there is a phase difference between the signal 401 and the signal 403 as explained above. When this occurs the voltage controlled oscillator 305 delays it's oscillations and operates to synchronize the trailing edge of it's output signal 403 with the trailing edge of the signal 401. On the other hand, the signal $\overline{403}$ inverts the output of the flip-flop 307. The output signals 408 and $\overline{408}$ are then available as clock signals for the desired NRZ (non-return-to-zero) data signals. If the flip-flop 306 is input with the signal 417 at the same time as the rising edge of the signal 408, it can output the signal 409 as the NRZ data.

Referring now to FIG. 5, an enlarged timing chart of the two succeeding pulses of the signal 401 of FIG. 4 is shown. The signal 417 is supplied to the flip-flop 306 from the NAND gate L and becomes "1" at the rising edge of the signal 408 and becomes "0" a short time after the rising edge of the signal 408. When the signal 401 is phase advanced or phase delayed, $T_3$ represents the read period of time in the delayed case and $T_4$ is the read period of time for the advanced case. If the pulse width of the signal 401 is shortened as illustrated by the signal 500, $T_5$, which is shorter than $T_3$, becomes the time period to read without error. If the pulse width of the signal 401 is lengthened as illustrated by the signal 501, $T_6$ which is shorter than $T_4$, becomes the time period to read without error. The most favorable position of the signal 401 with respect to the signal 408 may be attained by adjusting the pulse width of the signals 401 and 402 with the delay circuit 300. It is also possible to design the desired margin for reading by proper selection of the NAND gates A, B, C and D. When the pulse width of the signal 401 is quarter period of frequency 2F apart from the phase comparator and the flip-flop 306, the center of the pulse width of the signal 401 can be positioned at the rising edge of the signal 408. It is then possible to set margins in the same direction for both the phase comparator and the flip-flop 306 which is called a data separator.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A data exchange circuit for a magnetic memory apparatus, comprising:
   first generator means for generating modified frequency modulation data pulse signals and selectable width modified frequency modulation data pulse signals from modified frequency modulation signals read from signals stored in said magnetic memory media;
   phase lock loop means coupled to said first generator means for producing output signals synchronized to a predetermined edge of said selectable width data pulse signals;
   clock generator means coupled to said phase lock loop means for producing clock signals based on said output signals;
   said first generator means comprising delay circuit means for selecting the pulse width of said selectable width data pulse signals;
   gating means for logically combining said selectable width data signals and said phase lock loop output signals to produce phase optimized data signals defining a predetermined phase margin relative to said clock signals; and
   second generator means electrically connected to said clock generator means and said gating means for generating a non-return-to-zero signal based on the state of said phase optimized data signals at a predetermined edge of said clock signals.

2. The data exchange circuit, according to claim 1, wherein said delay circuit means includes:
   a delay circuit having an input connected to said first generator means and at least three outputs, for generating at least three output signals;
   instruction signal means for generating instruction signals to define data reading margins; and
   a gate circuit means, having respective inputs operably connected to said at least three outputs and said instruction signal means, for generating an output in accordance with said three output signals and said instruction signals, and having an output connected to said first generating means.

* * * * *